United States Patent [19]

Lauf et al.

[11] 4,393,124

[45] Jul. 12, 1983

[54] SOLID ELECTROLYTES STRENGTHENED BY METAL DISPERSIONS

[75] Inventors: Robert J. Lauf; Chester S. Morgan, both of Oak Ridge, Tenn.

[73] Assignee: The United States of America as represented by the United States Department of Energy, Washington, D.C.

[21] Appl. No.: 308,739

[22] Filed: Oct. 5, 1981

[51] Int. Cl.$^3$ .............................................. H01M 4/36
[52] U.S. Cl. ...................................... 429/104; 429/50; 429/193; 57/228
[58] Field of Search ................ 429/193, 189, 104; 50; 75/228, 230, 232

[56] References Cited

U.S. PATENT DOCUMENTS

| | | | |
|---|---|---|---|
| 3,077,589 | 12/1972 | Chiku et al. | 429/193 X |
| 4,021,255 | 5/1977 | Chiku et al. | 429/193 X |
| 4,117,208 | 9/1978 | Ludwig | 429/104 |
| 4,151,235 | 4/1979 | May et al. | 429/193 X |
| 4,234,338 | 11/1980 | Morgan et al. | 75/235 |
| 4,269,909 | 5/1981 | King et al. | 429/104 |
| 4,294,898 | 10/1981 | Hartstein | 429/193 X |

OTHER PUBLICATIONS

"Solid Electrolytes: The $\beta$-Aluminas," J. H. Kennedy, Chap. 5, vol. 21, *Topics in Applied Physics*, ed. S. Geller, Springer-Ver. Berlin (1977).

*Primary Examiner*—Charles F. LeFevour
*Attorney, Agent, or Firm*—C. Clay Carter; Stephen D. Hamel; Richard G. Besha

[57] ABSTRACT

An improvement in solid electrolytes of advanced secondary batteries of the sodium-sulfur, sodium-halogen, and like combinations is achieved by providing said battery with a cermet electrolyte containing a metal dispersion ranging from 0.1 to 10.0 vol. % of a substantially nonreactive metal selected from the group consisting essentially of Pt, Cr, Fe, Co, Ni, Nb, their alloys, and their physical mixtures in the elemental or uncombined state, the remainder of said cermet being an ion-conductive ceramic material.

7 Claims, No Drawings

SOLID ELECTROLYTES STRENGTHENED BY METAL DISPERSIONS

This invention is a result of a contract with the United States Department of Energy.

FIELD OF THE INVENTION

This invention relates to the art of advanced secondary batteries and, more particularly, to an improved solid electrolyte for such batteries. Solid electrolytes of the present invention are useful in advanced batteries of the type known as sodium-sulfur, sodium-halogen, and the like.

Background of the Invention

The low power-density to weight ratio of aqueous and organic electrolyte batteries has led to the development of advanced batteries of higher ionic conductivities. Such batteries are typically used as alternate power sources in motor vehicles, as load-leveling storage systems of electric utilities to meet variations in consumer demand, and for other uses. It is essential that batteries in such applications deliver high energy density, provide reliable service life, and maintain efficiency at a low cost.

The development of advanced batteries has been hampered by formidable problems such as the inability of these batteries to withstand mechanical shock and the thermal stresses attendent to their high-temperature operation. Another severe problem has been battery degradation caused by the deleterious discharge or reaction products generated during cycling. These discharge or reaction products cause either corrosion and like chemical-attack of battery components or formation of solid resistive layers or phases about these same components. In a typical battery, all components are subject to chemical or physical degradation. However, the principally affected components are the solid electrolyte with other components such as the casing, separators, current collectors, and seals also sustaining minor attack.

One particular type of solid electrolyte having widespread application in advanced batteries are those of sodium beta-alumina. For purposes of this description, sodium beta-alumina shall mean the family of sodium aluminates with the compositional ranges between $Na_2O.5\ Al_2O_3$ to $Na_2O.11\ Al_2O_3$. For a more complete description of properties, fabrication, and uses of sodium beta-alumina, see the article entitled "Solid Electrolytes: The $\beta$-Aluminas," by J. H. Kennedy in Chapter 5 of Volume 21 *Topics in Applied Physics*, edited by S. Geller, published by Springer-Verlag, Berlin, (1977); the details of which are herein incorporated by reference. Like other pure ceramic materials, solid monoliths of sodium beta-alumina are very brittle and lack mechanical integrity as well as thermal shock resistance.

Solid electrolytes of sodium beta-alumina have been deployed in advanced batteries of the type using sodium-sulfur, sodium-halogen, and their combinations. Generally, these batteries comprise a casing, an anode and a cathode positioned within the casing, and a solid electrolyte of sodium beta-alumina partitioning the casing to spatially dispose the anode from the cathode. Typical anode materials are molten sodium, sodium amalgam, or sodium in a nonaqueous electrolyte. Typical cathode materials are molten sulfur, as a free element or polysulfide, and/or molten sulfur in a molten halide salt. These batteries operate on the principal of high ionic conduction involving rapid sodium cation diffusion through the solid electrolyte during the transport process of electrons to or from an external circuit source. For this reason, metal-strengthened dispersions within solid electrolytes, such as sodium beta-alumina, are thought to be impractical because the presence of an elemental metal therein would lead to the expectation of electronic conductivity and complete or partial interference with the process of ionic conduction.

OBJECTS OF THE INVENTION

It is, therefore, an object of the present invention to provide a durable solid electrolyte strengthened by metal dispersions comprising a major phase of solid ceramic material and a minor, discontinuous phase of metal, said electrolyte characterized by the absence of electronic conduction while maintaining high ionic conduction.

It is another object of the present invention to incorporate said solid electrolyte into an advanced battery to provide a low-cost battery having improved mechanical integrity and thermal stress resistance.

It is still another object of the present invention to provide a reliable and highly efficient battery of the foregoing characteristics capable of withstanding degradation by corrosion or like chemical attack during cycling by providing improved physical and chemical properties to said electrolyte by inclusions of nonreactive metals selected from the group consisting essentially of Pt, Cr, Fe, Co, Ni, Nb, their alloys, and their physical mixtures.

It is yet another object of the present invention to provide such a battery having the unexpected ability to receive solid electrical components directly onto the solid electrolyte of the battery by conventional metal-joining processes.

These and other objects are satisfied by the present invention which is a cermet article suitable for use as a solid electrolyte of an advanced battery comprising a minor amount of metal particulates dispersed uniformly throughout the balance of said article which includes a predominant amount of a ceramic material.

According to another aspect of the present invention, a solid electrolyte having improved resistance to thermal stress and mechanical shock is provided for an advanced battery by strengthening said electrolyte with a metal dispersion comprising a minor amount of a metal material uniformly distributed throughout a predominant amount of a ceramic material and formed by confining said materials within an appropriate environment and by exposing them to sufficient temperature and a duration to densify said materials into said solid electrolytes.

DETAILED DESCRIPTION

Solid electrolytes provided by the present invention are more durable and suitable for deployment in advanced batteries than those previously known. Their improved chemical and physical properties are much preferred over conventional solid electrolyte because they offer improved thermal conductance, mechanical strength, and corrosion resistance. Failure mechanisms such as crack propagation and corrosion or like chemical attack of the electrolyte are reduced if not altogether obviated by the present invention.

Therefore, the present invention contemplates an advanced battery of the secondary or rechargeable species in which a cermet electrolyte of a predominant amount of ceramic material such as compounds of $Al_2O_3$ and $Na_2O$, contain uniformly dispersed metal particles of substantially nonreactive metal, such as Pt, Cr, Fe, Co, Ni, Nb, their alloys, and their physical mixtures in the elemental or uncombined state.

In the practice of the subject invention, the advanced battery is typically of the type known within the art as sodium-sulfur, sodium-halogen, and the like. The cermet electrolytes of the present invention may be prepared by procedures similar to those disclosed in commonly assigned U.S. Pat. No. 4,234,338 entitled "Thermal Shock Resistant Ceramic Insulator" and issued in the name of Chester S. Morgan and William R. Johnson on Nov. 18, 1980. An alternate procedure, particularly for chromium-type metal dispersions, may be adapted from a commonly assigned U.S. patent application Ser. No. 308,738, filed on even date herewith, entitled "Method For Fabricating Cermets of Alumina-Chromium Systems," by Chester S. Morgan, DOE docket S-55,610. Inasmuch as the solid electrolytes of the present invention can be prepared by similar procedures to those described in U.S. Pat. No. 4,234,338 and Ser. No. 308,738 above identified, these disclosures are incorporated herein by reference. While the foregoing references primarily concern preparation of metal-alumina compositions, the addition of $Na_2O$ to the alumina compositions as contemplated by the present invention are expected to be accomplished with only minimal changes in preparation procedures.

While batteries incorporating the cermet electrolytes of the present invention will still sustain about the normal amount of failures attributable to corrosion or like chemical attack of such elements as the casing, separator, collector, and seals, it is believed that such batteries will exhibit a marked increase in service life since degradation and other failure mechanisms in the solid electrolyte will be substantially reduced. Therefore, an electrolyte of greater mechanical integrity and other chemical and physical properties provided by the present invention is expected to substantially improve average service life.

Additionally, the ability to fixedly connect current collectors to the cermet electrolytes of the present invention is thought to obviate many problems related to formation of resistive layers and the like. Conventional metal joining processes known to the art, such as brazing or soldering, can now be utilized to make said fixed connections.

Cermets as solid electrolytes in advanced batteries are unknown because prior experience within the art would lead to the conclusion that introduction of metal dispersions to strengthen ceramic electrolytes would cause them to be undesirably subject to electronic conduction. Contrary to this expectation, we have found that discrete dispersions of finely divided metal particles can be introduced within ceramic electrolytes without any, or only minimal, deleterious affect on the ionic conductance of $Na^+$ ions within the electrolyte while, surprisingly, no electronic conductance has been observed.

Metals useful in the practice of our invention are stable metals that are substantially inert or nonreactive with reaction products or degradation products of the battery's cycle of chemical operations. Suitable metals are Pt, Cr, Fe, Co, Ni, Nb, their alloys, and their physical combinations in the elemental or uncombined state. Preferred metals are Pt, Cr, and their alloys or combinations. Other metals are also potentially deployed in the subject invention so long as they provide low resistivities and the requisite resistance to corrosive or like chemical attack.

Typical amounts of metals dispersed in the solid electrolyte of the present invention are those amounts sufficient to strengthen the cermet electrolyte material without the introduction of electronic conduction. Generally, such additions are limited within the optimal range of about 0.1 to 10.0 vol. % metal with 0.5 to 5.0 vol. % metal being preferred and 0.5 to 3.0 vol. % metal ideal.

The preferred ceramic electrolyte material utilized in the preparation of the cermet electrolytes of the present invention is a sodium beta-alumina having a cationically conductive crystalline structure consisting essentially of a structural lattice and sodium cations which are mobile in relation to said lattice. Selective variations in sodium beta-alumina compositions ranging from $Na_2O.5Al_2O_3$ to $Na_2O.11Al_2O_3$ and their combinations may be utilized in the practice of the present invention. Stabilizing amounts of $LiO_2$ and $MgO$ can be added without difficulty if needed in the ultimate composition. Because of the greater ionic conductivity of $Na_2O.5Al_2O_3$, stabilized by minor additions of $LiO_2$ or $MgO$, we prefer its incorporation as the predominant portion of the cermets of this invention.

In order to demonstrate the effectiveness of the solid electrolyte of the present invention in an advanced battery, a series of experiments to determine resistivities of solid electrolytes were run. The results of these tests are summarized in Table I. As can be seen therein, the resistivity of a cermet electrolyte (BAP-1) containing 2 vol. % Pt prepared in accordance with the present invention exhibited a lower resistivity by about 7% as compared to that of a prior art cermet (BA-1) prepared without a metal strengthening dispersion. Both of these solid electrolytes contained approximately 1:1 mixtures of $Na_2O.11Al_2O_3$ to $Na_2O.5Al_2O_3$. As a base line for further comparison, the resistivity of a pure $Na_2O.5Al_2O_3$ solid cermet prepared according to the prior art is also reported in Table I.

TABLE I

| | Resistivity of Solid Electrolytes at 300° C. | | |
|---|---|---|---|
| Sample No. | Treatment | Composition | Resistivity[a] |
| BA-1 | As hot-pressed | $\beta + \beta''$ $Al_2O_3$ | 6.0 Ω-cm |
| BAP-1 | As hot-pressed | $\beta + \beta''$ $Al_2O_3$ - 2% Pt | 5.6 Ω-cm |
| Literature[b] | Pressed and sintered | $\beta''$ - $Al_2O_3$ | 4.0–4.6 Ω-cm |

[a]Ionic transport number 1.0.
[b]M. L. Miller et al., Am. Cer. Soc. Bulletin 58, 522–526 (1979).

The following fabrication procedures demonstrate that fine metal dispersions of substantially nonreactive metals can be added as a minor phase, constituting no more than about 10% by volume of a solid electrolyte matrix and that a cermet electrolyte is thereby attainable which is suitable for deployment in advanced secondary batteries.

PROCEDURE I $Na_2O.5Al_2O_3$-Pt

A stabilized mixture of about 5:1 $Al_2O_3$ and $Na_2O$, containing trace amounts of $Li_2O$ and/or MgO, powders of about 0.5 to 10 micron size range are mixed with aqueous solutions of $PtCl_4$ in sufficient amount to provide 0.5 5.0 vol. % Pt in the ultimate densified cermet.

The solution is evaporated and the $PtCl_4$ is reduced by rapid heating of dried mixture in one atmosphere $H_2$ to 850° C. and held for 8 to 10 minutes. The resultant metal-ceramic powder mixture is hot-pressed at about 41.4 MPa to 82.7 MPa and 1200° to 1700° C. for 10 to 30 minutes to provide a cermet of about 90-100% theoretical density.

PROCEDURE II

$Na_2O.5Al_2O_3$-Cr

A stabilized mixture of about 5:1 $Al_2O_3$ and $Na_2O$, containing trace amounts of $Li_2O$ and/or MgO, powders of about 0.5 to 10 micron size range are slurried with an effective amount of hexane containing paraffin to coat said powders by evaporation of solvent to dryness. The overcoated powders are contacted with a sufficient amount of $Cr(NO_3)_3.9H_2O$ solution to provide 0.5 to 5.0 vol. % Cr in the ultimate densified cermet. The solution is evaporated and the $Cr(NO_3)_3$ is reduced by rapid heating of dried mixture in about one atmosphere $H_2$ to about 1000° to 1500° C. and held for 8 to 10 minutes. The resultant metal-ceramic powder mixture is hot-pressed at about 41.4 MPa to 82.7 MPa and 1200° to 1700° C. for 10 to 30 minutes to provide a cermet of about 90-100% theoretical density.

It will be apparent to those skilled in the art of solid electrolyte ceramics that a wide variety of battery systems can be made with beta-alumina electrolytes fabricated according to the procedures of this invention. Dependent upon the ultimate application a variety of cathode and anode materials may be substituted for those described herein. Such devices and modifications or improvements are intended to be within the scope of our invention.

Thus, an improved advanced battery is provided by the present invention which has a high ionic conductivity and a high power to weight density.

What is claimed is:

1. In a secondary battery, a solid electrolyte comprising:
   an ion-conductive sodium beta-alumina ceramic material; and
   a discontinuous metal phase dispersed throughout said ceramic material and selected from the group consisting of Pt, Cr, Fe, Co, Ni, Nb and alloys and mixtures thereof.

2. The secondary battery solid electrolyte of claim 1 wherein the metal phase content ranges from about 0.1 to 10.0 vol. %, the balance being sodium beta-alumina ceramic material.

3. The secondary battery solid electrolyte of claim 1 wherein the dispersed metal phase is Pt or Pt alloy and the ceramic material is sodium beta-alumina.

4. The secondary battery solid electrolyte of claim 1 wherein the dispersed metal phase is Cr or Cr alloy and the ceramic material is sodium beta-alumina.

5. The secondary battery solid electrolyte of claim 1 wherein said ceramic material comprises $Na_2O.11Al_2O_3$.

6. A method of inhibiting battery degradation during cycling comprising providing a battery with a cermet solid electrolyte employing a finely dispersed phase of metal particulates selected from the group consisting essentially of Pt, Cr, Fe, Co, Ni, Nb, their alloys, and their physical mixtures in the elemental or uncombined state, said metal phase comprising from about 0.1 to 10.0 vol. % of the ultimate article, essentially uniformly dispersed within a solid electrolyte sodium beta-alumina ceramic material which constitutes the volume balance of said electrolyte.

7. The method of claim 6 wherein said battery is of the sodium-sulfur, sodium-halogen, and like combination types.

* * * * *